United States Patent [19]
McNabb

[11] Patent Number: 5,813,574
[45] Date of Patent: Sep. 29, 1998

[54] FROZEN BEVERAGE DISPENSING APPARATUS

[76] Inventor: Rex P. McNabb, P.O. Box 460879, Garland, Tex. 75046

[21] Appl. No.: 731,758

[22] Filed: Oct. 18, 1996

[51] Int. Cl.[6] ........................................... B67D 5/62
[52] U.S. Cl. ................................... 222/146.6; 222/400.7; 222/518; 222/564
[58] Field of Search .............................. 222/146.6, 400.7, 222/400.8, 518, 559, 564; 239/548

[56] References Cited

U.S. PATENT DOCUMENTS

| | | | |
|---|---|---|---|
| 4,742,942 | 5/1988 | Dokos et al. | 222/564 |
| 4,860,931 | 8/1989 | Hubbard | 222/400.8 |
| 4,877,158 | 10/1989 | Kohler | 222/400.8 |
| 5,487,493 | 1/1996 | McNabb | 222/146.6 |
| 5,573,145 | 11/1996 | Groh | 222/400.7 |

FOREIGN PATENT DOCUMENTS

| | | | |
|---|---|---|---|
| 2340648 | 2/1975 | Germany | 239/548 |
| 2225839 | 6/1990 | United Kingdom | 222/564 |
| 2225840 | 6/1990 | United Kingdom | 222/564 |

*Primary Examiner*—Joseph Kaufman
*Attorney, Agent, or Firm*—W. Kirk McCord

[57] ABSTRACT

Improved frozen drink dispensing apparatus includes a container for storing a beverage under pressure in at least a partially frozen state, a normally closed dispensing valve mounted with the container and a manually operable lever for operating the dispensing valve. The dispensing valve has a longitudinal bore communicating with the interior of the container. A conduit depends from the dispensing valve for dispensing the beverage when the valve is in an open position by operation of the lever. A diffusion member is located in the conduit for diffusing the beverage material generally outwardly from a central longitudinal axis of the conduit and upwardly within the conduit, thereby substantially reducing the pressure under which the beverage is dispensed. The diffusion member has an internal chamber communicating with the valve bore and an interior bottom surface, which is sloped upwardly toward an inner wall of the diffusion member. The inner wall of the diffusion member has plural ports through which the beverage flows from the chamber into a dispensing passageway within the conduit. The ports are angled upwardly and cooperate with the interior bottom surface of the diffusion member to direct the material generally outwardly from a central longitudinal axis of the passageway and upwardly within the passageway. Each port is oriented along an axis which is offset laterally relative to a radial axis for imparting a swirling motion to the beverage as the beverage passes through the ports.

20 Claims, 2 Drawing Sheets

5,813,574

FROZEN BEVERAGE DISPENSING APPARATUS

FIELD OF THE INVENTION

This invention relates generally to apparatus for dispensing frozen beverages and in particular to an improved frozen beverage dispensing apparatus.

BACKGROUND ART

Both carbonated and non-carbonated beverages may be stored in a frozen or partially frozen state and dispensed in the form of a slush. Typically, frozen or partially frozen beverages are stored and dispensed under pressure.

One problem associated with prior art apparatus for dispensing frozen beverages is that the frozen beverage is typically stored under relatively high pressure (e.g., 37 psi) in a storage tank or the like. A dispensing valve is connected to the storage tank and is operable by means of a lever or other manually operable device. When the valve is open, there is often a sudden blast of the pressurized beverage, which may result in an unpleasant surprise to the person operating the dispensing valve and may also result in loss of control of the cup or other container used to capture the beverage by the person operating the dispensing valve. The problem is exacerbated when the dispensing apparatus is in a defrost cycle. During the defrost cycle, the beverage may be at least partially melted. If the dispensing valve is operated during the defrost cycle, the beverage will be dispensed at an even greater force because it is in a more liquid state.

Another problem associated with prior art dispensing apparatus is the problem of residual leakage after the dispensing apparatus has been operated. Typically, some of the beverage will be present in the dispensing valve body downstream of the valve seat. Even after the dispensing valve has been closed, residual material may leak from the dispensing faucet connected to the valve body.

U.S. Pat. No. 4,911,333 discloses a beverage dispensing valve having a valve seat with a specially designed passageway that directs the frozen material radially outwardly toward the walls of the valve bore rather than axially toward the valve outlet. A manually operable lever is used to move a valve pin into and out of engagement with the valve seat to close and open the valve, respectively. A lockout member engages an opening in the valve pin to prevent the valve pin from being moved to the open position when the dispensing apparatus is in the defrost cycle. The lockout member engages the valve pin inside the valve body.

Although the valve seat disclosed in the aforementioned U.S. Pat. No. 4,911,333 reduces the dispensing pressure, the dispensing valve is still subject to leakage after the valve is closed because of the frozen material inside the passageway of the valve seat and in the faucet portion beneath the valve seat, particularly after the frozen material has melted. Another problem associated with this type of dispensing apparatus is that the lockout member engages the valve pin inside the valve body, such that the lockout condition is not apparent to one who may attempt to operate the valve, such as a member of the general public. Forceful operation of the lever may disengage the lockout member from the valve pin or even break the lockout member.

U.S. Pat. No. 5,487,493 discloses a frozen beverage dispensing apparatus having a latch member which engages a manually operable actuating member of the dispensing apparatus at the onset of the defrost cycle, to prevent the actuating member from being operated during the defrost cycle. Because the latch member engages the actuating member on the outside of the valve body, the lockout condition is apparent to one who may attempt to operate the actuating member.

U.S. Pat. No. 5,487,493 further discloses a diffusion member located in a conduit through which the frozen beverage is dispensed for diffusing the frozen beverage generally outwardly from a central longitudinal axis of the conduit and downwardly. Even though the frozen beverage is diffused generally outwardly within the conduit, the frozen beverage may still be dispensed under excessive pressure if the beverage is in a liquid state (i.e., during the defrost cycle).

There is therefore a need for an improved frozen beverage dispensing apparatus to overcome the aforementioned problem of excessive dispensing pressure.

SUMMARY OF INVENTION

In accordance with the present invention, apparatus for dispensing material in at least a partially frozen state is provided. The apparatus includes a container for storing the material under pressure and a valve mounted with the container for controlling the dispensing of the material. The valve includes a valve body having a bore communicating with the interior of the container, closure means disposed in the bore for closing the bore to prevent the material from passing therethrough when the closure means is in a first position, and actuating means for moving the closure means to a second position wherein the material is allowed to pass through the bore. A conduit depends from the valve body. The conduit has an internal passageway through which the material is dispensed when the closure means is in the second position.

In accordance with one feature of the invention, the apparatus further includes diffusion means for diffusing the material generally outwardly from a central longitudinal axis of the passageway and upwardly within the passageway. In one embodiment, the diffusion means includes a diffusion member located in the passageway and having an open top, a closed bottom and at least one wall extending between the top and bottom. The at least one wall defines a chamber within the diffusion member, the chamber communicating with the bore through the open top, whereby the material flows under pressure into the chamber when the closure means is in the second position. The diffusion member has an interior bottom surface which slopes upwardly toward the at least one wall and the at least one wall has at least one port extending outwardly and upwardly through the at least one wall from the chamber to the passageway, whereby material flowing under pressure into the chamber when the closure means is in the second position is directed outwardly and upwardly through the at least one port into the passageway.

In the preferred embodiment, the at least one wall is a generally cylindrical wall defining a generally cylindrical chamber within the diffusion member. Plural ports are spaced at substantially equal angular intervals around the generally cylindrical wall. Each of the ports extends outwardly and upwardly through the generally cylindrical wall from the chamber to the passageway. Further, each port extends through the generally cylindrical wall outwardly along an axis which is offset laterally with respect to a radial axis and which is sloped upwardly with respect to the corresponding radial axis.

In accordance with another feature of the invention, an inner wall of the conduit which defines the passageway includes a tapered upper portion, such that material flowing under pressure through the ports into the passageway is directed toward the tapered upper portion. The tapered upper portion is located above a location where each of the ports communicates with the passageway and directs the material downwardly in the passageway. In the preferred embodiment, the inner wall of the conduit also includes a tapered lower portion. Both the upper and lower portions are tapered radially outwardly in a downward direction. The upper portion is tapered substantially more than the lower portion. The conduit further includes a neck portion, which is generally cylindrical and has male threads on an outer surface thereof The valve body has a socket with female threads. The neck portion is in mating relationship with the socket with male threads of the neck portion engaging the female threads of the socket, whereby the conduit is removeably coupled to the valve body. The neck portion further includes female threads on an inner surface thereof and the diffusion member has male threads on an outer surface thereof. The diffusion member is in mating engagement with the neck portion with the male threads of the diffusion member engaging the female threads of the neck portion, whereby the diffusion member is removeably coupled to the conduit within the passageway and is in co-axial relationship with the conduit, such that a central longitudinal axis of the chamber is co-incident with the central longitudinal axis of the passageway.

In accordance with yet another feature of the invention each of the ports is sloped upwardly from the chamber to the passageway at an angle which is not as steep as the angle at which the interior bottom surface of the diffusion member is sloped upwardly. For example, the interior bottom surface may sloped upwardly at an angle of approximately 30 degrees with respect to a radial axis, while each of the ports may be sloped upwardly at an angle of approximately 20 degrees with respect to a radial axis. This compound angle inhibits the material from backflowing into the chamber after it has been directed into the passageway.

In accordance with the present invention, an improved frozen beverage dispensing apparatus is provided, which prevents the material from being dispensed under excessive pressure. By diffusing the material outwardly and upwardly within the dispensing passageway, the dispensing pressure is reduced. Further, because the ports are offset relative to respective radial axes, a swirling motion is imparted to the material as it is directed through the ports, thereby further reducing the dispensing pressure. The tapered upper portion of the conduit directs the material downwardly within the passageway after the dispensing pressure has been substantially reduced.

BEST MODE FOR CARRYING OUT THE INVENTION

Figure 1:
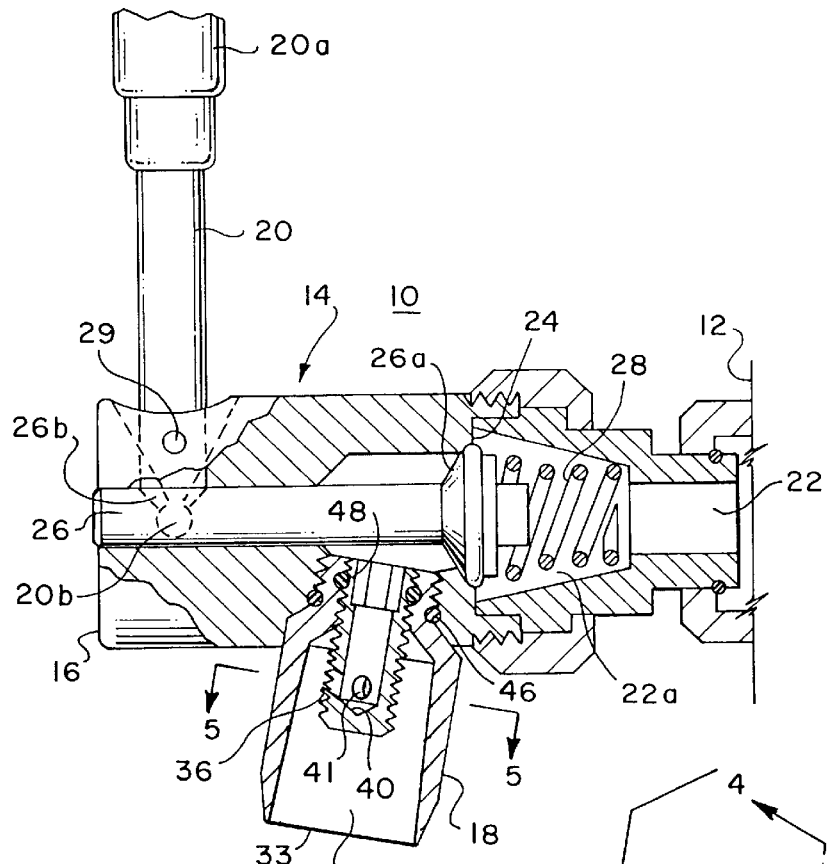
FIG. 1 is a cross-sectional view of a frozen beverage dispensing apparatus, according to the present invention.

In the description which follows, like parts are marked throughout the specification and drawings with the same respective reference numerals. The drawings are not necessarily to scale and in some instances proportions may have been exaggerated in order to more clearly describe the invention.

Referring to FIG. 1, an apparatus 10 for dispensing material in at least a partially frozen state is depicted. The material is preferably frozen or semi-frozen with the consistency of a slush. For example, the material may be a frozen beverage. Apparatus 10 includes a storage container 12, which is operably connected to a refrigeration system (not shown) for cooling the interior of container 12 to maintain the beverage in a frozen or semi-frozen state.

A dispensing valve 14 is mounted with container 12. Valve 14 includes a valve body 16, a dispensing conduit 18 depending downwardly from valve body 16 and a manually operable lever member 20 mounted for tilting movement. Lever member 20 is mounted for fore and aft tilting movement to operate valve 14. Lever member 20 has a handle portion 20a to facilitate manual operation thereof. Valve body 16 has a generally elongated bore 22 communicating with the interior of container 12. Intermediate portion 22a of bore 22 is cone-shaped to define a shoulder 24, which functions as a seating surface for a valve actuating member 26, which is reciprocally moveable within bore 22. Actuating member 26 has a conical end portion 26a, which functions as a seat member by engaging shoulder 24 to close off bore 22 and prevent passage of material therethrough. Valve 14 is shown in a closed position in FIG. 1. A spring member 28 biases actuating member 26 toward the closed position shown in FIG. 1. When actuating member 26 is in the closed position, lever member 20 is oriented substantially vertically, as shown in FIG. 1.

End 20b of lever member 20, which is opposite from handle portion 20a, is received within an opening 26b in actuating member 26. Lever member is pivotally mounted with valve body 16 by means of a pivot pin 29 such that when lever member 20 is tilted in an aft direction (i.e., away from container 12), end 20b is moved in a forward direction (i.e., toward container 12), thereby disengaging end portion 26a from shoulder 24. The torque applied to lever member 20 overcomes the force of spring member 28, thereby compressing spring member 28 as actuating member 26 is moved in the direction of container 12.

Figure 2:
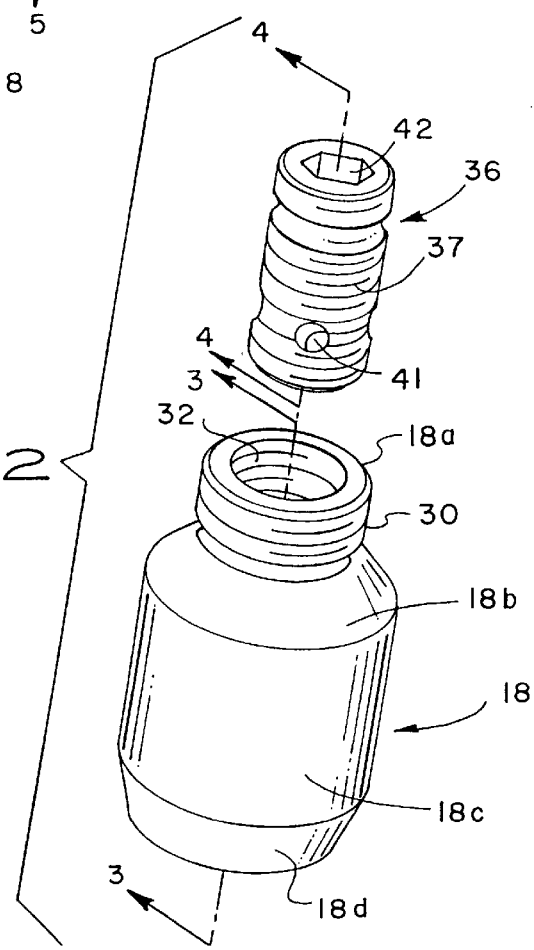
FIG. 2 is an exploded perspective view of a dispensing conduit and diffusion member located within the conduit, which are part of the apparatus of FIG. 1.
Figure 3:
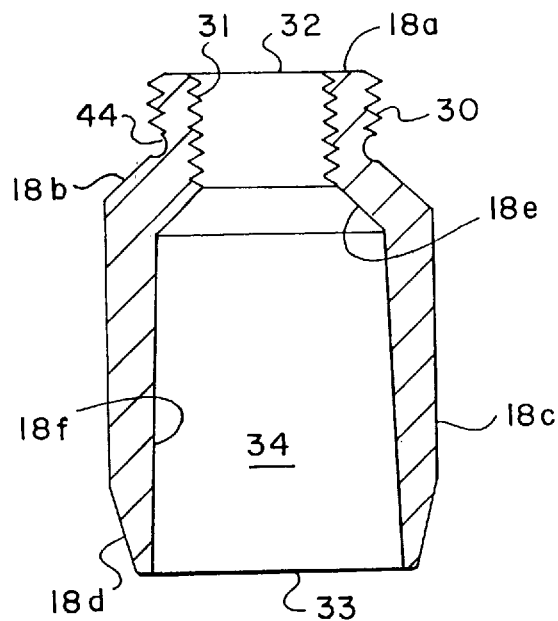
FIG. 3 is a sectional view, taken along the line 3—3 of FIG. 2.

Referring also to FIGS. 2 and 3, conduit 18 functions as a faucet for dispensing the frozen beverage. Conduit 18 has a generally barrel-shaped exterior with a generally cylindrical neck portion 18a having male threads 30 on an outer surface thereof and female threads 31 on an inner surface thereof. The exterior of conduit 18 below neck portion 18a defines a first tapered portion 18b, a substantially cylindrical portion 18c and a second tapered portion 18d. First tapered portion 18b is tapered outwardly in a downward direction at an angle of about 45 degrees with respect to a longitudinal axis of conduit 18. Second tapered portion 18d is tapered radially inwardly in a downward direction at an angle of about 15 degrees with respect to a longitudinal axis of conduit 18. Neck portion 18a is positioned in mating relationship with a female threaded socket in valve body 16, as can be best seen in FIG. 1. Male threads 30 engage the female threads in the socket, whereby conduit 18 is removeably coupled to valve body 16. Conduit 18 has an overall length of about 1.375 inch.

As can be best seen in FIG. 3, conduit 18 has an opening 32 at the top of neck portion 18a, an opening 33 at the bottom of second tapered portion 18d and an internal passageway 34 communicating between openings 32 and 33. An inner wall of conduit 18, which defines passageway 34, includes a third tapered portion 18e, which is tapered radially outwardly in a downward direction and a fourth tapered portion 18f, which is also tapered radially outwardly in a downward direction, but with substantially less taper than third tapered portion 18e. For example, fourth tapered portion 18f may be tapered at an angle of only about two degrees relative to a central longitudinal axis of conduit 18, whereas third tapered portion 18e may be tapered at an angle of about 30 degrees relative to the central longitudinal axis of conduit 18. The slight taper of fourth tapered portion 18f defines a slightly flared passageway 34 to facilitate passage of the material therethrough and dispensing of the material through bottom opening 33. For example, fourth tapered portion 18f may increase the diameter of passageway 34 from about 0.687 inch at the intersection of third and fourth tapered portions 18e, 18f to about 0.715 at bottom opening 33. The lengthwise extent of fourth tapered portion 18f may be about 0.937 inch, compared to a 1.375 inch overall length of conduit 18.

Figure 4:
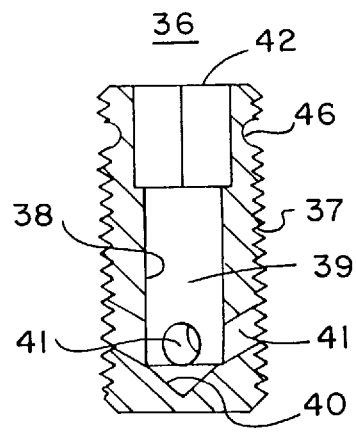
FIG. 4 is a sectional view, taken along the line 4—4 of FIG. 2.
Figure 5:
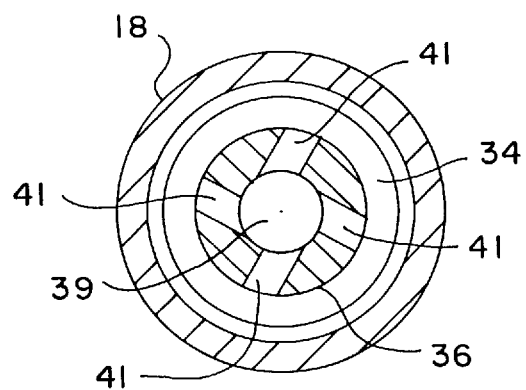
FIG. 5 is a sectional view, taken along the line 5—5 of FIG. 1.

Referring also to FIGS. 4 and 5, a diffusion member 36 is located within passageway 34, as can be best seen in FIG. 1. Diffusion member 36 is generally cylindrical with a length of about ⅞ inch and has male threads 37 on an outer surface thereof which are in engagement with female threads 31 of neck portion 18a, whereby diffusion member 36 is removably coupled to conduit 18. Diffusion member 36 has a generally cylindrical inner wall 38 which defines a generally cylindrical internal chamber 39. An interior bottom surface 40 of diffusion member 36 is sloped upwardly toward inner wall 38 at an angle between 15 degrees and 60 degrees (preferably about 40 degrees) with respect to a lateral axis extending radially outwardly from a central longitudinal axis of chamber 39. The central longitudinal axis of chamber 39 is co-incident with a central longitudinal axis of passageway 34, such that conduit 18 is in coaxial relationship with diffusion member 36.

Wall 38 has plural generally circular ports 41 extending therethrough, which are spaced at substantially equally angular intervals about wall 38. Each port 41 has a diameter of approximately of ⅛ inch. Although four ports 41 are shown in the drawings, one skilled in the art will recognize that the number of ports 41 may be greater than or less than four. Each port 41 communicates between chamber 39 and passageway 34 and extends outwardly and upwardly through wall 38 from chamber 39 to passageway 34. The upward angle of each port 41 is in a range from about 10 degrees to 40 degrees (preferably about 30 degrees) relative to a radial axis. As can be best seen in FIG. 4, the upward slope of each port 41 is less than the upward slope of bottom surface 40, such that a compound angle is defined by bottom surface 40 and each port 41. This compound angle inhibits material in passageway 34 from backflowing into chamber 39 through ports 41. As can be best seen in FIG. 5, each port 41 is also offset laterally from a corresponding radial axis in a range from about 10 degrees to 40 degrees (perferably about 20 degrees).

Chamber 39 communicates with bore 22 through a top opening 42 in diffusion member 36. Opening 42 is in co-axial relationship with opening 32 of conduit 18. In operation, when lever member 20 is moved in a forward direction (i.e., toward container 12) to move actuating member 26 away from shoulder 24, valve 14 is opened to allow material to flow through bore 22 into chamber 39 through opening 42 . The material contacts bottom surface 40, which directs the material upwardly and outwardly toward wall 38. Ports 41 communicate with chamber 39 at respective locations which are elevated with respect to an uppermost portion of bottom surface 40. Material flows through ports 41 into passageway 34. Bottom surface 40 cooperates with ports 41 to direct the material radially outwardly and upwardly, such that material entering passageway 34 is directed both outwardly and upwardly.

Ports 41 communicate with passageway 34 at respective locations which are below third tapered portion 18e. Material enters passageway 34 with sufficient force that the material impinges on third tapered portion 18e, which deflects the material back downwardly within passageway 34. By directing the material upwardly as well as outwardly within passageway 34, the pressure under which the material is dispensed through conduit 18 is substantially reduced. Furthermore, as previously mentioned, ports 41 are oriented along respective axes which are offset laterally with respect to corresponding radial axes. As such, a swirling motion is imparted to the material as it passes through ports 41, thereby further reducing the dispensing pressure. The slightly flared fourth tapered portion 18f further facilitates the dispensing of the material. As previously mentioned, the upward slope of each port 41 is not as steep as the upward slope of bottom surface 40, such that bottom surface 40 and each port 41 define a compound angle. This compound angle substantially inhibits material from flowing back into chamber 39 through ports 41 after the material has been directed into passageway 34. Second tapered portion 18d facilitates placement of a cup or other container (not shown) over bottom opening 33 of conduit 18 for receiving the material dispensed therefrom.

As can be best seen in FIG. 3, conduit 18 has a circumferential notch 44 located between neck portion 18a and first tapered portion 18b for receiving an O-ring 46 (FIG. 1). Similarly, as can be best seen in FIG. 4, diffusion member 36 also has a circumferential notch 47 for receiving an O-ring 48 (FIG. 1). O-ring 46 provides substantially leak-proof engagement between conduit 18 and valve body 16 and O-ring 48 provides substantially leak-proof engagement between diffusion member 36 and conduit 18.

The best mode for carrying out the invention has now been described in detail. Since changes in and additions to the above-described best mode may be made without departing from the nature, spirit, and scope of the invention, the invention is not to be limited to the aforementioned details, but only by the appended claims and their equivalents.

It is claimed:

1. In an apparatus for dispensing material in at least a partially frozen state, said apparatus having a container for storing the material under pressure; a valve mounted with said container for controlling the dispensing of the material, said valve having a valve body with a bore communicating with an interior of said container; closure means disposed in said bore and being adapted to close said bore to prevent the material from passing therethrough when said closure means is in a first position; actuating means for moving said closure means to a second position wherein material is allowed to pass through said bore; and a conduit depending from said valve body, said conduit having an internal passageway through which the material is dispensed when said closure means is in said second position, wherein the improvement comprises:

diffusion means for diffusing the material generally outwardly from a central longitudinal axis of said passageway and upwardly within said passageway, said diffusion means including a diffusion member located in said passageway and having an open top, a closed bottom and at least one wall extending between said top and said bottom, said at least one wall defining a chamber within said diffusion member, said chamber communicating with said bore through said open top, whereby material flows under pressure into said chamber when said closure means is in said second position, said diffusion member having an interior bottom surface which is sloped upwardly toward said at least one wall and said at least one wall having at least one port extending outwardly and upwardly through said at least one wall from said chamber to said passageway, whereby material flowing under pressure into said chamber when said closure means is in said second position is directed outwardly and upwardly within said passageway.

2. Apparatus of claim 1 wherein said at least one wall has plural ports, each port extending outwardly and upwardly through said at least one wall from said chamber to said passageway.

3. Apparatus of claim 1 wherein said at least one wall is a generally cylindrical wall defining a generally cylindrical chamber within said diffusion member.

4. Apparatus of claim 3 wherein said generally cylindrical wall has plural ports spaced at substantially equal angular intervals around said generally cylindrical wall, each of said ports extending outwardly and upwardly through said generally cylindrical wall from said chamber to said passageway.

5. Apparatus of claim 4 wherein each of said ports extends through said generally cylindrical wall along an axis which is offset laterally with respect to a radial axis and sloped upwardly with respect to said radial axis.

6. Apparatus of claim 3 wherein said at least one port extends through said generally cylindrical wall along an axis which is offset laterally with respect to a radial axis and sloped upwardly with respect to said radial axis.

7. Apparatus of claim 1 wherein said passageway includes a tapered upper portion, material flowing under pressure through said at least one port into said passageway being directed toward said tapered upper portion, said tapered upper portion being above a location where said at least one port communicates with said passageway.

8. Apparatus of claim 7 wherein said passageway further includes a tapered lower portion, said upper portion and said lower portion being tapered radially outwardly in a downward direction, said upper portion being tapered substantially more than said lower portion.

9. Apparatus of claim 8 wherein said conduit includes a neck portion having male threads on an outer surface thereof, said valve body having a socket with female threads, said neck portion being in mating relationship with said socket with said male threads engaging said female threads, whereby said conduit is removably coupled to said valve body.

10. Apparatus of claim 9 wherein said neck portion has female threads on an inner surface thereof and said diffusion member has male threads on an outer surface thereof, said diffusion member being in mating relationship with said neck portion with the male threads of said diffusion member engaging the female threads of said neck portion, whereby said diffusion member is removably coupled to said conduit within said passageway.

11. Apparatus of claim 1 wherein said at least one port is sloped upwardly from said chamber to said passageway, said interior bottom surface being sloped upwardly at a steeper angle than an angle at which said at least one port is sloped upwardly.

12. Apparatus of claim 1 wherein said central longitudinal axis is oriented generally transversely with respect to a longitudinal axis of said bore.

13. Apparatus of claim 1 wherein said diffusion member is in co-axial relationship with said conduit, such that a central longitudinal axis of said chamber is co-incident with the central longitudinal axis of said passageway.

14. In a device for dispensing material in at least a partially frozen state, the device including a container for storing the material under pressure; a valve mounted with the container for controlling the dispensing of the material, the valve having a valve body with a bore communicating with an interior of the container; a closure member disposed in the bore and being adapted to close the bore to prevent the material from passing therethrough when the closure member is in a first position; and an actuating member for moving the closure member to a second position wherein the material is allowed to pass through the bore, apparatus for diff-using the material as it is being dispensed, said apparatus comprising:

a conduit mounted with the valve body, said conduit having an internal passageway through which the material is dispensed when the closure member is in the second position; and a diffuser located in said passageway, said diffuser having an open top, a closed bottom and at least one wall extending between said top and said bottom, said at least one wall defining a chamber inside said diff-user, said chamber communicating with the bore through said top, whereby material is able to flow under pressure from the bore into said chamber when the closure member is in the second position, said diffuser having an interior bottom surface which is sloped upwardly toward said at least one wall, said at least one wall having at least one port extending outwardly and upwardly through said at least one wall from said chamber to said passageway, whereby material flowing under pressure into said chamber when the closure member is in the second position is directed outwardly and upwardly through said at least one port into said passageway.

15. Apparatus of claim 14 wherein said at least one wall is a generally cylindrical wall defining a generally cylindrical chamber inside said diff-user and said generally cylindrical wall has plural ports spaced at substantially equal angular intervals around said generally cylindrical wall.

16. Apparatus of claim 15 wherein each of said ports extends through said generally cylindrical wall outwardly along an axis which is offset laterally with respect to a radial axis and which is sloped upwardly with respect to said radial axis.

17. Apparatus of claim 15 wherein each of said ports is sloped upwardly from said chamber to said passageway, said interior bottom surface being sloped upwardly at a steeper angle than an angle at which each of said ports is sloped upwardly.

18. Apparatus of claim 14 wherein said passageway has a tapered upper portion, material flowing under pressure through said at least one port into said passageway being directed toward said tapered upper portion, said tapered upper portion being above a location at which said at least one port communicates with said passageway.

19. Apparatus of claim 18 wherein said passageway further includes a tapered lower portion, said upper portion and said lower portion being tapered radially outwardly in a downward direction, said upper portion being tapered substantially more than said lower portion.

20. In a device for dispensing material in at least a partially frozen state, the device including a container for storing the material under pressure; a valve mounted with the container for controlling the dispensing of the material, the valve having a valve body with a bore communicating with an interior of the container; a closure member disposed in the bore and being adapted to close the bore to prevent the material from passing therethrough when the closure member is in a first position; and an actuating member for moving the closure member to a second position wherein the material is allowed to pass through the bore, apparatus for diffusing the material as it is being dispensed, said apparatus comprising:

a conduit mounted with the valve body, said conduit having an internal passageway through which the material is dispensed when the closure member is in the second position; and a diffuser located in said passageway and having means for diff-using the material radially outwardly from a central longitudinal axis of said passageway and upwardly within said passageway.

* * * * *